Aug. 1, 1961     T. C. KELLER     2,994,566

SAFETY LUBRICATING AND ALARM DEVICE

Filed Oct. 31, 1956

INVENTOR:
THOMAS C. KELLER

By Gravely, Lieder, Woodruff and Willer
ATTORNEYS.

2,994,566
Patented Aug. 1, 1961

2,994,566
SAFETY LUBRICATING AND ALARM DEVICE
Thomas C. Keller, Canton, Ohio, assignor to The Timken Roller Bearing Company, Canton, Ohio, a corporation of Ohio
Filed Oct. 31, 1956, Ser. No. 619,465
7 Claims. (Cl. 308—1)

The present invention relates generally to lubricating and alarm devices and more particularly to safety lubricating and alarm devices for anti-friction roller bearing assemblies and the like which provide a margin of safety or extend the operability of overheated bearing members and at the same time give an alarm signal to indicate by smoke, odor or the like the overheated condition.

The present invention comprises the addition to roller bearing assemblies and the like of pockets or chambers for high temperature melting point grease formed in the mounting adapter which engages the bearing assembly. The pockets are positioned adjacent the usually non-rotative outer race member of a bearing assembly and the safety lubricant contained in the mounting adapter has the characteristic property of melting and lubricating the outer race when the anti-friction or roller bearing assembly overheats and tends to operate with the outer race acting as a plain bearing journal. This lubricating action relieves the frictional forces acting on the overheated bearing members and gives off an alarm signal which can be seen and smelt in time to prevent more serious consequences.

It is an object of the present invention to provide pockets or chambers in mounting means for anti-friction or roller bearing assemblies for safety lubricant, which lubricant remains in the chambers under normal bearing operation temperatures, but flows and lubricates certain bearing members to relieve bearing friction and prevent damage when excessive friction occurs in the assembly.

Another object of the invention is to provide alarm means for signaling an overheated or hot box condition in a bearing assembly.

Another object is to provide alarm means for signaling an overheated condition in a bearing structure that also acts to relieve the bearing friction generated in the bearing assembly.

A still further object of the invention is to reduce damage to bearing assemblies caused by the assemblies overheating.

Figure 1:
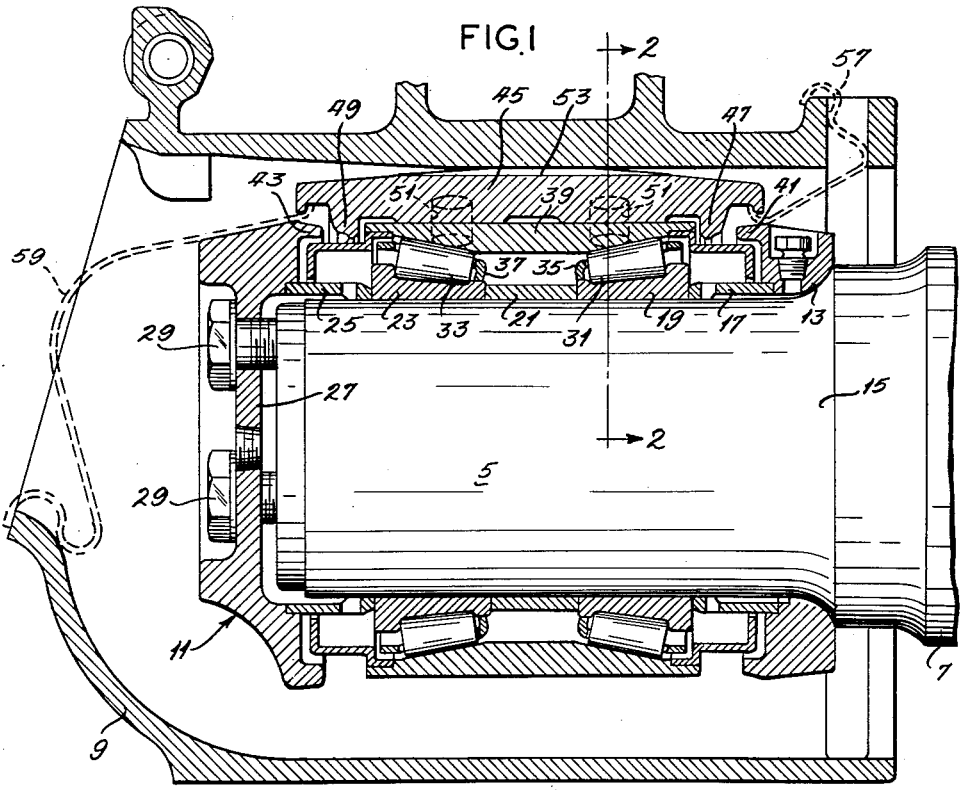
Figure 2:
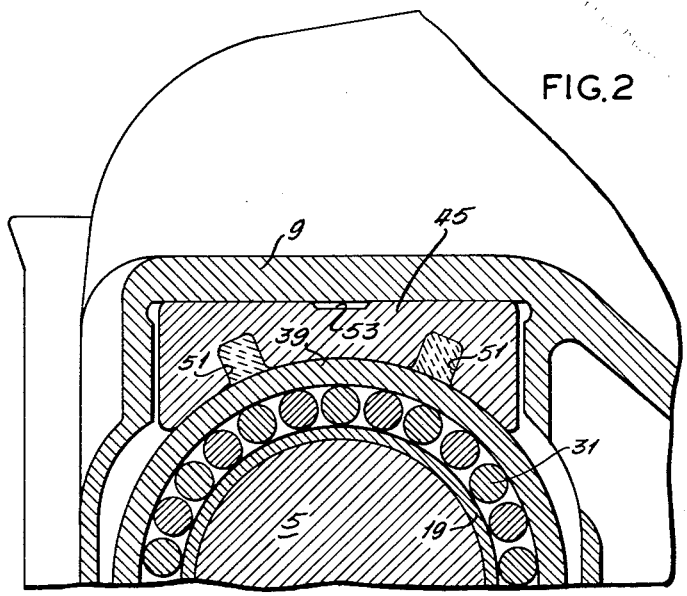

Other objects and advantages of the present invention will become apparent after considering the detailed specification in connection with the accompanying drawing, in which:

FIG. 1 is a cross-sectional elevational view of a bearing assembly installed on a journal and including the safety lubricating means taught by the present invention, and FIG. 2 is a cross-sectional view of the bearing assembly in FIG. 1 taken along line 2—2 therein.

Referring to the drawing more particularly by reference numerals, number 5 refers to an axle journal, such as axle 7 of a typical railway vehicle truck axle. The journal 5 extends into a journal box 9, and a bearing assembly 11 is mounted on the journal 5 and is received in box 9.

The bearing assembly has backing ring 13 mounted adjacent shoulder 15 of the journal 5. The bearing assembly is adjacent the backing ring 13 and includes in succession an annular sleeve 17 which abuts the backing ring 13 on one side, an inner race 19 which abuts the opposite end of the annular sleeve 17, a spacer member 21, another inner race member 23, and an outer annular sleeve 25. An end cap 27 is attached to the end of the journal 5 by bolts 29 and holds the members 17, 19, 21, 23, and 25 on the journal 5.

Tapered rollers 31 and 33 are mounted on the inner race members 19 and 23 respectively and suitable cages 35 and 37 are provided for these rollers 31 and 33. A cylindrical outer race member 39, having oppositely disposed tapered bearing races, is positioned engaging the outer surfaces of the rollers 31 and 33.

The opposite ends of the outer member 39 are spaced from flanges 41 and 43 on the backing ring 13 and the end cap 27 respectively forming annular shaped channels therewith. A suitable wedge or wear member 45 (FIGS. 1 and 2) straddles the outer race 39 above the bearing assembly 11 and has downwardly extending flanges 47 and 49 which extend into the annular channels just described and act to limit endwise relative movement between the wedge 45 and outer race 39. The body portion of the wedge 45 conforms to the surface of the outer race member 39 and extends therealong over the upper portion thereof so that the outer race 39 can move or rotate relative to the wedge 45. Under normal operation of the bearing members, it is the intention that the outer race 39 shift its position or creep relative to the wedge 45 so that the load zone in the outer race 39 changes and gives extended bearing life.

The wedge 45 is provided with downwardly opening pockets or chambers 51 (there are four such pockets in this case) which are important to the present invention. It is contemplated, however, that a different number of such pockets 51 could be used in a particular situation. The pockets 51 are positioned above the race member 39 of the bearing assembly 11 and are filled with a high melting point lubricant, such as high melting point greases, the chemical composition of which forms no part of the present invention. However, sodium and lithium soap greases have been successfully employed for this purpose and the addition to the greases of graphite, silicone derivatives, and other high temperature lubricants has been found desirable.

The wedge 45 is also provided with a relief groove 53 which runs axially along its upper surface and which prevents the concentration of loading on the center of the bearing and spreads the load over a large circumference of the top of the bearing. In FIG. 1, the journal 5 and the bearing assembly 11 are shown as they are mounted in the journal box 9. During installation of the bearing assembly 11 in the journal box 9, the wedge 45 is temporarialy supported in the journal box 9 by holding clips such as clips 57 and 59.

The cup shaped pockets 51 in the wedge 45 are filled with the safety lubricant such as high melting point grease which has the characteristics of melting when subjected to high temperature heat. Under normal operating conditions the high melting point grease remains in the pockets 51 and the engagement of the wedge 45 on the outer race 39 is such that the grease is prevented from escaping. However, if the normal source of lubricant which is provided for the assembly becomes excessively diminished, or if excessive friction develops between the relatively movable bearing members due to this or any other cause, heat will be generated by the assembly, and this heat in turn will cause the grease in the chambers 51 to melt and to flow between the wedge 45 and the outer race 39. This supply of lubricant to the outer surface of the outer race 39 prepares the part to rotate in the wedge 45 and converts the bearing to a plain bearing. Also, as the temperature of the assembly 11 increases, smoke and odor is given off by the melting grease which gives an alarm or warning that the assembly is overheated. Preferably the ingredients of the grease are such that when the grease melts or burns, it gives off an easily detected smoke and may also produce an easily detected odor.

Obviously, the safety lubricating device described in this specification employs a principle that may be applied in many different forms and to many different kinds of bearing assemblies. Furthermore, the pockets 51 may be installed in members other than the wedge member 45. For example, they can be formed in the races, in the housing, the end cap and backing ring, and even in the rollers if so desired without departing from the spirit of the invention.

Thus, it is apparent that there has been provided a novel safety lubricating and hot box alarm device for vehicle anti-friction bearing assemblies and the like which fulfills all of the advantages and objects sought therefor.

It is to be understood that the foregoing description and accompanying drawing have been given only by way of illustration and example and that changes and alterations in the present disclosure which will be readily apparent to one skilled in the art, are contemplated as within the scope of the present invention which is limited only by the claims which follow.

What I claim is:

1. An improvement in vehicle anti-friction bearing assemblies which have relatively movable bearing members to prevent damage to the bearing members caused by overheating comprising a mounting member, a bearing assembly positioned under the mounting member and capable of moving relative thereto, said mounting member having a chamber formed therein adjacent to and in free flow communication with the bearing assembly for positioning lubricant which is characterized by being immobile under normal operating conditions of the bearing members but which becomes free flowing for lubricating the bearing assembly and the mounting member thereon when subjected to heat generated by excessive friction between the relatively movable bearing members.

2. In a bearing structure having relatively movable bearing members including an inner race, an outer race, and anti-friction members positioned therebetween, a mounting member positioned on said outer race and capable of movement relative thereto, said mounting member having a chamber formed therein adjacent to said outer race for positioning lubricant which is characterized by being immobile during normal operating conditions but which responds by becoming fluid and flowing between said mounting member and said outer race when heated by excessive friction between the bearing members.

3. A safety device for relieving the frictional forces associated with an overheated vehicle anti-friction bearing assembly and for giving off a signal of said overheated condition comprising a bearing assembly having an inner race, an outer race and anti-friction bearing members positioned therebetween; a bearing wedge mounted on said outer race so that the outer race can move relative thereto, said wedge having a chamber formed therein adjacent to the outer race for positioning lubricant which is characterized by having the properties of melting and flowing between the wedge and the outer race when heated in response to excessive bearing friction and which gives off smoke and odor when so heated.

4. In a vehicle anti-friction bearing assembly including an axle journal, a journal box, and anti-friction bearing means operatively mounted on the axle journal in the journal box, the improvement comprising a wedge device disposed between the journal box and the bearing means to take the vehicle loads, said wedge device being movable relative to the bearing means, and a normally solid lubricant body disposed between said wedge device and the bearing means, said solid body being affected by abnormally high bearing operating temperatures to flow between said wedge device and the bearing means and lubricate the abutting surfaces.

5. In a vehicle anti-friction bearing assembly including an axle journal, a journal box, and anti-friction bearing means operatively mounted on the axle journal in the journal box, the improvement comprising a wedge device disposed between the journal box and the bearing means to take the vehicle loads, said wedge device being movable relative to the bearing means, and a normally solid lubricant body disposed between said wedge device and the bearing means, said solid body being affected by abnormally high bearing operating temperatures to flow between said wedge device and the bearing means and lubricate the abutting surfaces, and to signal the abnormal operating temperatures by giving off easily detected smoke and odor.

6. In a railway vehicle axle bearing assembly for a side frame journal box, the improvement of anti-friction bearing means for the vehicle axle including an outer race, a wedge member disposed between the journal box and said outer race, said outer race being adapted to creep rotationally relative to the wedge member under normal operating conditions, and lubricant supply means communicating with the adjacent surfaces of said wedge member and outer race, said lubricant supply being effective under normal operating conditions of said bearing to lubricate said outer race as a plain bearing in said wedge.

7. In a vehicle axle bearing and bearing box assembly, the improvement of a bearing mounting member relatively stationary in the bearing box, and an anti-friction bearing on the vehicle axle including an outer member in friction contact with said mounting member, said mounting and outer members being normally in engagement and relatively movable in normal operation of said anti-friction bearing, and safety lubricant means carried by one of said members, said means including a chamber containing lubricant that is characterized by flowing between and supplying lubricant to said surfaces in friction contact to reduce the friction therebetween and to emit smoke and odor whenever said lubricant is excessively heated by friction in the anti-friction bearing.

References Cited in the file of this patent

UNITED STATES PATENTS

| | | |
|---|---|---|
| 558,693 | Korbuly | Apr. 21, 1896 |
| 1,979,875 | Faus | Nov. 6, 1934 |
| 1,980,123 | Weber | Nov. 6, 1934 |
| 2,566,494 | Leese | Sept. 4, 1951 |

FOREIGN PATENTS

| | | |
|---|---|---|
| 20,029 | Great Britain | 1913 |
| 311,644 | Great Britain | May 16, 1929 |

UNITED STATES PATENT OFFICE
CERTIFICATE OF CORRECTION

Patent No. 2,994,566                                                          August 1, 1961

Thomas C. Keller

It is hereby certified that error appears in the above numbered patent requiring correction and that the said Letters Patent should read as corrected below.

Column 4, line 33, for "normal" read -- abnormal --.

Signed and sealed this 1st day of May 1962.

(SEAL)
Attest:

ERNEST W. SWIDER
Attesting Officer

DAVID L. LADD
Commissioner of Patents